United States Patent [19]

Takama et al.

[11] Patent Number: 5,505,568
[45] Date of Patent: Apr. 9, 1996

[54] ROTARY CUTTING TOOL

[75] Inventors: Haruichi Takama; Tatsuhiko Hayase, both of Nagoya, Japan

[73] Assignee: Mitsubishi Jukogyo Kabushiki Kaisha, Tokyo, Japan

[21] Appl. No.: 35,210

[22] Filed: Mar. 22, 1993

[51] Int. Cl.⁶ .................................................. B23P 15/28
[52] U.S. Cl. ................................ 407/7; 407/64; 407/65; 82/158; 82/161
[58] Field of Search .................................. 407/7, 64, 65; 82/158, 161

[56] References Cited

U.S. PATENT DOCUMENTS

| | | | |
|---|---|---|---|
| 2,230,455 | 2/1941 | Githens | 407/7 |
| 2,233,724 | 3/1941 | Bannister et al. | 407/7 |
| 3,515,029 | 6/1970 | Gambini | 407/7 |
| 4,191,075 | 3/1980 | Morgunsky et al. | 82/158 |
| 4,477,211 | 10/1984 | Briese | 407/7 |
| 4,507,024 | 3/1985 | Stashko | 407/114 |
| 4,893,967 | 1/1990 | Briese | 407/7 |

FOREIGN PATENT DOCUMENTS

| | | | |
|---|---|---|---|
| 2842183 | 3/1979 | Germany | 407/7 |
| 2-51005 | 4/1990 | Japan . | |

Primary Examiner—Bruce M. Kisliuk
Assistant Examiner—Eileen P. Morgan
Attorney, Agent, or Firm—Wenderoth, Lind & Ponack

[57] ABSTRACT

A cutting tool holder is composed of a cutting tool holder main body 1 and a bracket 2 mounted to the top of a front end portion of the main body, which are fixedly secured to each other by a clamping bolt 3 and a knock pin 4. At the front end portion of the cutting tool holder main body 1 is provided a plane inclined with respect to the bottom surface of the main body 1 and a dovetail groove to be used for mounting a cartridge. A lower stopper 5 and a lower pressor metal 8 are provided for positioning and fixing the lower portion of the cartridge when inserted into the dovetail groove. The bracket 2 is provided with an upper stopper 6 and an upper pressor metal 10 for supporting and fixing the upper portion of the cartridge. In the cartridge, a hollow rotary shaft 13 is fitted around a washer-faced rigid shaft 12 via bearings. A circular die throw-away tip 14 is fitted around the rotary shaft 13 and is fixed to the rotary shaft jointly with a chip breaker 16 by a nut 15. The cartridge is provided at the front end portion of the cutting tool holder 1 and inclined with respect to a vertical axis of the holder.

24 Claims, 4 Drawing Sheets

ROTARY CUTTING TOOL

BACKGROUND OF THE INVENTION

1. Field of the Invention

The present invention relates to a rotary cutting tool supported by a cutting tool holder, and more particularly to a rotary cutting tool suitable for heavy cutting work of barely machinable materials, such as titanium, inconel and the like.

2. Description of the Prior Art

As one example of the above-mentioned type of cutting tool holders developed in the prior art, a rotary cutting tool holder shown in FIG. 8 has been known. In this figure, an axial bore for inserting a rotary shaft 32 is provided at a tip end portion of a cutting tool holder 1'. The rotary shaft 32 is inserted into this axial bore and is supported by a radial bearing 33 and a thrust bearing 34, and is fixed to the cutting tool holder 1' via a thrust bearing 35 and by means of a nut 36. At the axial end of the rotary shaft 32 is fixedly fitted a circular die throw-away tip 37.

Since the rotary shaft 32 is inclined by an angle $\alpha°$ with respect to a vertical axis of the cutting tool holder 1', as shown in FIG. 9, during cutting work, the circular die throw-away tip 37 can cut while it is rotating in a fixed direction due to a principal component force of a cutting resistance force (See FIG. 7).

Accordingly, the entire circumferential edge of the circular die throw-away tip 37 serves as a cutting edge and is worn out uniformly, and therefore the life of the tool can be greatly improved. In addition, impacts upon intermittent cutting work can be mitigated and chipping of the cutting edge also can be prevented (See Laid-Open Japanese Utility Model Specification 2-51005 (1990)).

However, in heavy cutting work such as roughing and the like, the heretofore known cutting tools as described above would involve the following problems:

(1) Due to the fact that the circular die throw-away tip 37 is fixed to the axial end of the rotary shaft 32, the rotary shaft 32 would bear a cutting resistance force in a cantilever fashion, and hence its rigidity in the radial direction of the tip is low. Consequently, chattering would occur during the cutting work, resulting in that machining cannot be achieved under satisfactory cutting conditions, and the cutting efficiency is lowered.

(2) In the event that the rotary shaft 32 and the bearings should be worn out, repairs would be necessary. During that time they cannot be used. In the case of heavy cutting, the consumption rate is especially severe.

SUMMARY OF THE INVENTION

The present invention has been developed for the purpose of resolving the above-mentioned shortcomings of the rotary cutting tools in the prior art, and it is one object of the present invention to provide a rotary cutting tool having a high rigidity which can be used continuously without repair even if a rotary shaft or a bearing portion is worn out.

A more specific object of the present invention is to provide a rotary cutting tool which enables the achievement of heavy cutting and thereby achieving a reduction of the number of man-hours.

Another specific object of the present invention is to provide a rotary cutting tool which can achieve cutting work with a high precision, with the machined surface having a small roughness, by supporting a throw-away or disposable tip with a high rigidity.

Still another specific object of the present invention is to provide a rotary cutting tool which is constructed in such manner that a throw-away tip can be easily mounted and dismounted in a cartridge fashion.

According to one feature of the present invention, there is provided a rotary cutting tool that is improved in that a cartridge consisting of a washer-faced rigid shaft i.e. a rigid shaft having an annular surface, a hollow rotary shaft fitted to the rigid shaft and rotatable coaxially therewith and a disposable circular die tip fixedly fitted to the rotary shaft are provided a tip end portion of a cutting tool holder so as to be inclined by an appropriate angle with respect to a vertical axis of the cutting tool holder. Further, stoppers and pressor metals (clamps) for supporting the cartridge at both its upper and lower ends and fixing it to the cutting tool holder are provided.

In the rotary cutting tool according to the present invention, due to the fact that the washer-faced rigid shaft for supporting a circular die throw-away tip is fixedly supported by the cutting tool holder at two locations, at an upper end and a lower end along the direction of action of a cutting force, the rigidity in the radial direction of the tip is remarkably improved, and heavy cutting becomes possible.

In addition, as a result of the fact that a rotary shaft and a bearing portion are formed into a cartridge, and they are separated from a cutting tool holder, even if the rotary shaft and the bearing portion should be worn out, the machine can be continuously used without necessitating repair by merely exchanging the cartridge, and therefore a reduction of tool expenses can be achieved.

BRIEF DESCRIPTION OF THE DRAWINGS

The above-mentioned and other objects, features and advantages of the present invention will become more apparent by reference to the following description of one preferred embodiment of the present invention taken in conjunction with the accompanying drawings, in which.

DESCRIPTION OF THE PREFERRED EMBODIMENT

Figure 1:
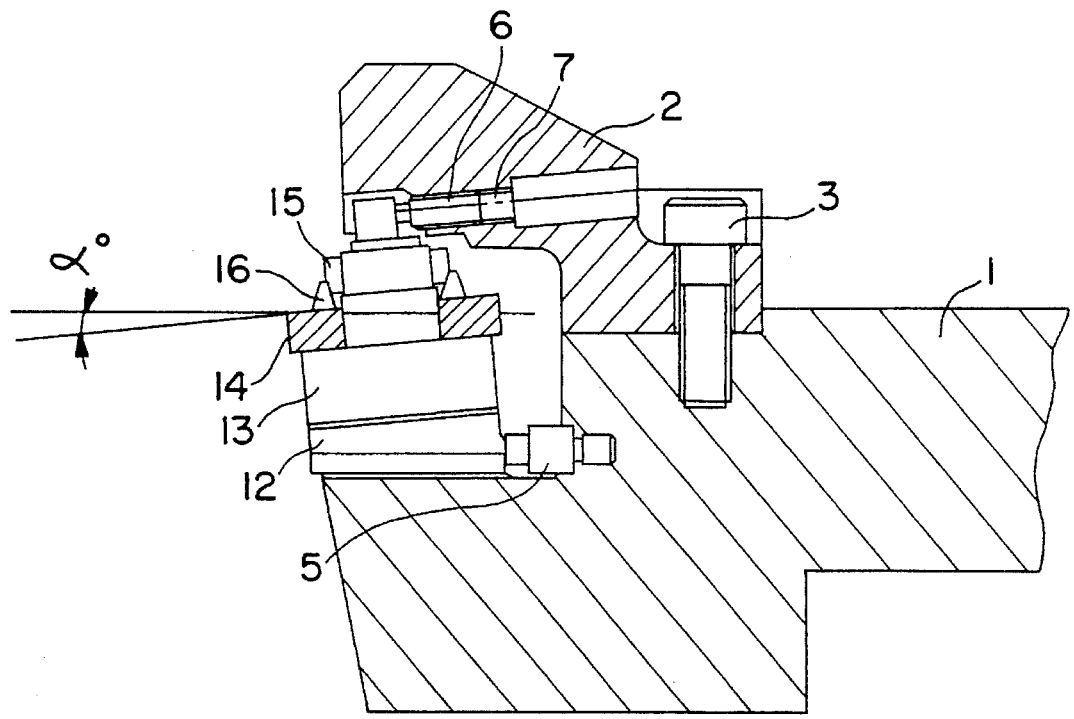
FIG. 1 is a front view of a rotary cutting tool according to one preferred embodiment of the present invention.
Figure 2:
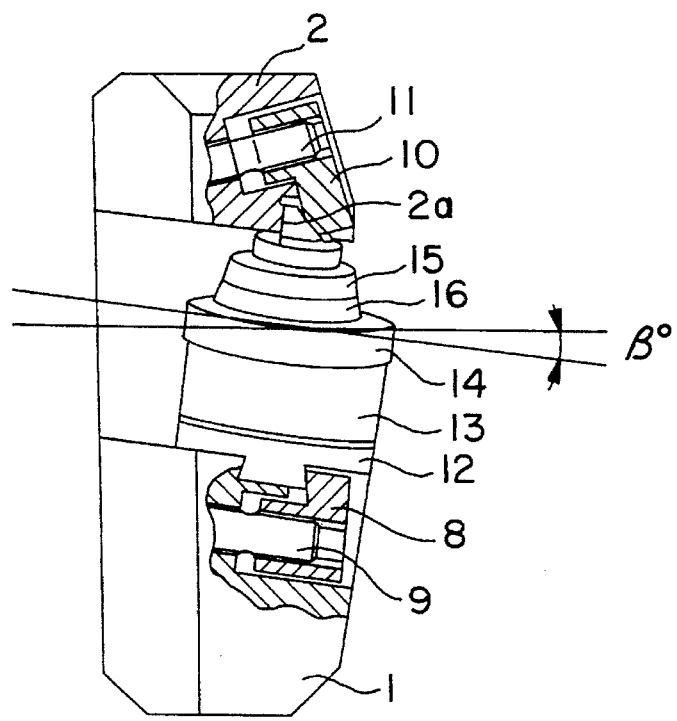
FIG. 2 is a left side view of the rotary cutting tool shown in FIG. 1.

Now the present invention will be described in greater detail in connection with one preferred embodiment thereof and with reference to FIGS. 1 to 7.

A construction of a rotary cutting tool consists, roughly of a cartridge for fitting and fixing a circular die throw-away tip to a rotary shaft and a cutting tool holder for holding the cartridge.

In these figures, the cutting tool holder is composed of a main body 1 and a bracket 2 mounted to a front end of an upper portion of the main body 1. The bracket 2 is fixed to the main body 1 by means of a clamping bolt 3 and a knock pin 4.

In a front portion of the cutting tool holder main body 1 are formed a plane inclined by $\beta°$ with respect to a bottom surface of the main body 1 and a dovetail groove to be used for mounting the cartridge. In addition, in the front portion of the main body 1 are provided a lower stopper 5 and a lower pressor metal or clamp 8 to be used for positioning and fixing a lower portion of the cartridge. The lower pressor metal 8 is fastened or released by means of a screw 9.

The reason why a tip 14 is inclined by $\alpha°$ (an acute angle as illustrated) in FIG. 1 is to give a necessary clearance angle to a knife edge when the tip 14 performs cutting work.

The bracket 2 is provided with an upper stopper 6 and an upper pressor metal or clamp 10 for the purpose of supporting and fixing an upper portion of the cartridge. The upper pressor metal 10 is fastened (or loosened) by means of a screw 11. The upper stopper 6 is of an adjustable type that makes use of a screw, and is fixed by means of a lock screw 7 after it has been finely adjusted so as to come into contact with the cartridge simultaneously with the lower stopper 5.

In addition, on the bracket 2 is formed a plane 2a inclined by $\beta°$ (an acute angle as illustrated) with respect a plane perpendicular to a vertical axis of the holder main body 1 for the purpose of supporting the upper portion of the cartridge.

Upon mounting the cartridge, the cartridge is fitted in the dovetail groove of the holder main body 1, and is inserted by being slid until it comes into contact with the lower stopper 5 and the upper stopper 6. Under this condition, the cartridge is clamped by the lower pressor metal 8 and the upper pressor metal 10. At this moment, a bottom surface 12a of the cartridge must be held in tight contact with a mounting plane of the main body 1.

The cartridge is formed by fitting a hollow rotary shaft 13 around a washer-faced rigid shaft 12 and fixing it with a nut 20 via radial bearings 18 and thrust bearings 17 and 19.

The rotary shaft 13 is coaxial with the washer-faced rigid shaft 12 and is freely rotatable. A circular die throw-away tip 14 is fitted around the rotary shaft 13, and it is fixed to the rotary shaft 13 jointly with a chip breaker 16 by means of a nut 15. It is to be noted that the threaded portion of the nut 15 is formed with left-hand threads in order to prevent loosening during cutting work. In addition, the cartridge is required to have a mount reference plane and a clamping plane for mounting it to the cutting tool holder, and these planes are all formed on the washer-faced rigid shaft 12.

On the bottom surface of the washer-faced rigid shaft 12 are formed a plane 12a inclined by $\alpha°$ and dovetail groove guide surfaces 12b and 12c inclined with respect to the plane 12a and symmetric with respect to the axis. Furthermore, a plane 12d perpendicular to the planes 12a, 12b and 12c is provided.

At the top portion of the washer-faced rigid shaft are formed a plane 12e perpendicular to the plane 12a and parallel to a midplane between the plane 12b and the plane 12c, a plane 12f perpendicular to the plane 12e and a plane 12g inclined by 30°–60° with respect to the plane 12e.

Thereby, when the cartridge is provided in the cutting tool holder, five locations of the washer-faced rigid shaft 12, consisting of the planes 12a, 12b, 12d, 12e and 12f are supported by the cutting tool holder, and two upper and lower locations thereof, consisting of the planes 12g and 12c, respectively, are clamped by the pressor metals 10 and 8, respectively.

Next, description will be made of a principle of rotation of the circular die throw-away tip 14 and its operations in the case where cutting is effected by means of the rotary cutting tool constructed in the above-described manner.

Figure 6:
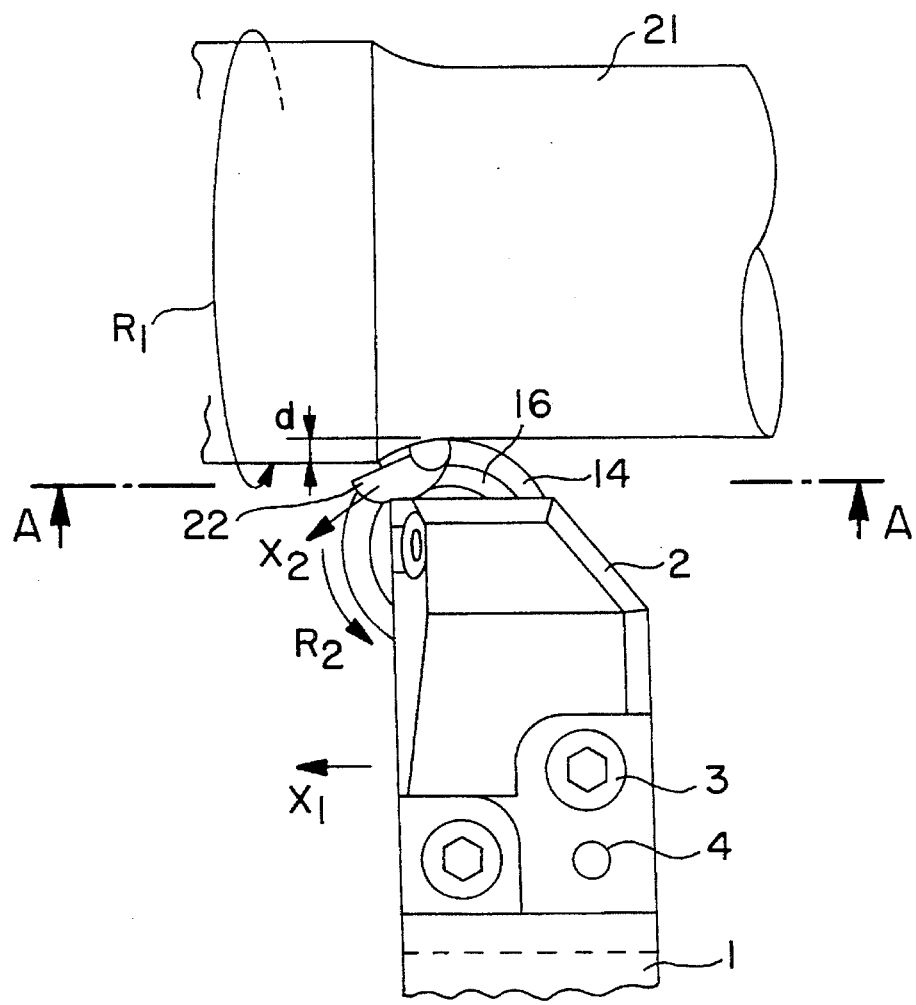
FIG. 6 is a schematic plan view showing a principle of rotation of a tip of the illustrated embodiment of the present invention.
Figure 7:
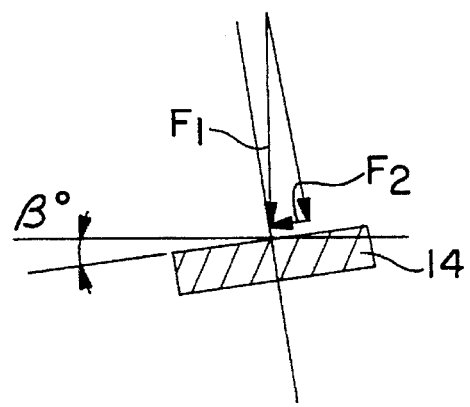
FIG. 7 is an enlarged partial cross-section view taken along line A—A in FIG. 6 as viewed in the direction of the arrows.
Figure 8:
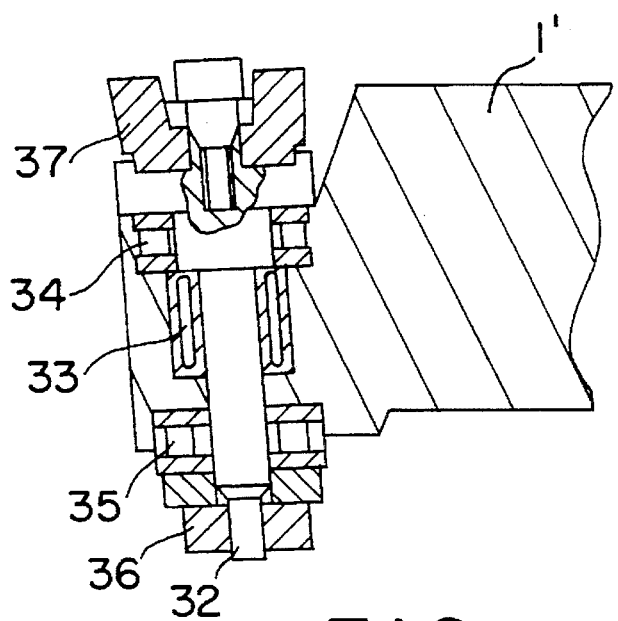
FIG. 8 is a cross-sectional front view of one example of a rotary cutting tool in the prior art.
Figure 9:
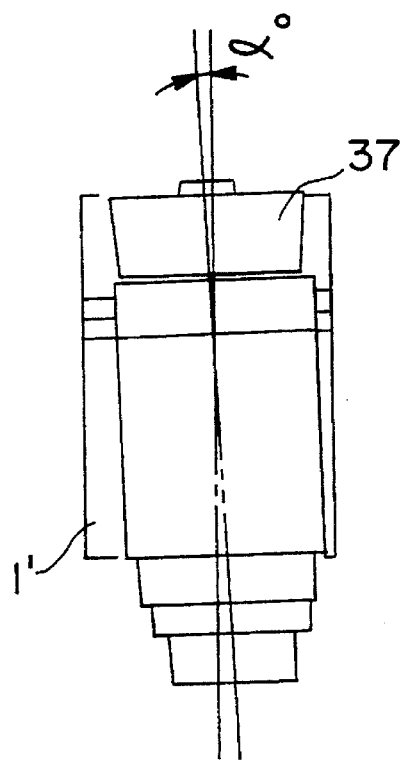
FIG. 9 is a schematic front view of the same rotary cutting tool in the prior art.

FIG. 6 is a plan view showing a state where a rotary cutting tool is fixed on a tool rest of a lathe (not shown) and the outer diameter of a round work piece 21 is being turned. FIG. 7 is a cross-sectional view taken along line A—A in FIG. 6 as viewed in the direction of the arrows. The work piece 21 is turning in the direction of an arrow $R_1$. If the rotary cutting tool is fed in the direction of an arrow $X_1$ while maintaining a depth of cut $\underline{d}$, then a chip 22 is discharged in the direction of an arrow $X_2$ by a cutting edge of the circular die throw-away tip 14. The chip 22 is cut as it is being curled by the chip breaker 16.

During the cutting work, the circular die throw-away tip 14 is cutting while being rotated continuously in the direction $R_2$, although slowly. This is due to the fact that since the top surface of the circular die throw-away tip 14 is inclined by $\beta°$, (an acute angle as illustrated), a component force $F_2$ of a cutting reaction force $F_1$ acts upon the upper surface of the circular die throw-away tip 14 in its circumferential direction (see FIG. 7).

Consequently, the entire circumferential edge of the circular die throw-away tip 14 serves as a cutting edge, the entire circumferential edge wears uniformly, and thereby the tool life is greatly improved.

From the above, it is seen that in the above-described rotary cutting tool, notches and grooves would not arise. Accordingly, in lathing work of heat-resistant alloys such as titanium 6AL-4V, inconel 718, etc., for which proceeding of notches and grooves is violent, the advantage is remarkable.

In addition, in intermittent work, there is an effect of mitigating impacts during cutting work, whereby tipping of the cutting edge can be prevented.

While the present invention has been described in detail above on the basis of the illustrated embodiment, it is a matter of course that the present invention should not be limited to the illustrated embodiment, and that changes and modifications could be applied to the configuration and structure within the scope of the present invention as set forth in the appended claims.

Figure 3:
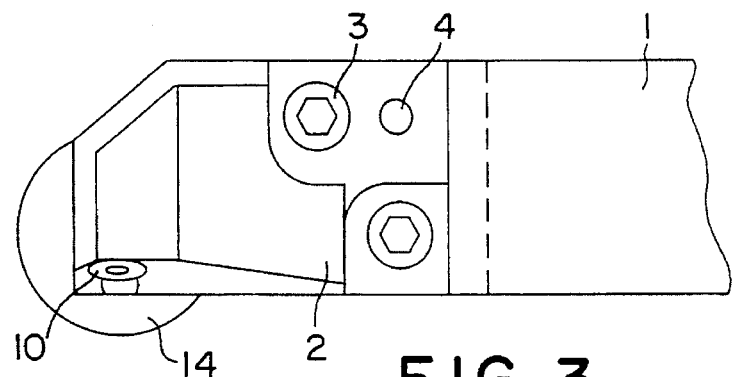
FIG. 3 is a plan view of the rotary cutting tool shown in FIG. 1.
Figure 4:
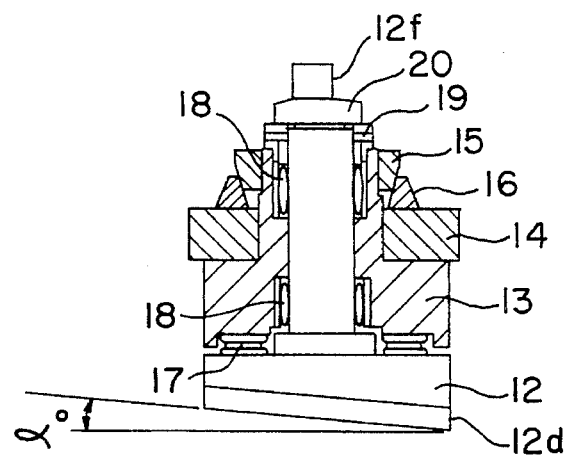
FIG. 4 is a cross-section front view of a cartridge according to one preferred embodiment of the present invention.
Figure 5:
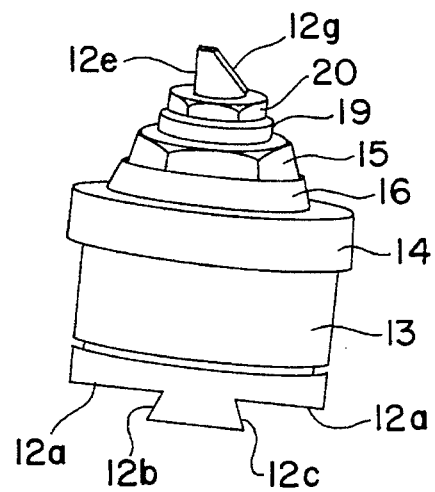
FIG. 5 is a left side view of the cartridge shown in FIG. 4.

For example, although the above description of one preferred embodiment of the present invention was with respect to a right-hand rotary cutting tool in which a cutting edge is present on the right side as viewed from the left side of FIG. 3, in the case of a left-hand rotary cutting tool it is only necessary to manufacture both the cutting tool holder and the cartridge in a symmetric shape with respect to those illustrated. However, in this case, the threaded portion of the nut 15 for clamping the circular die throw-away tip 14 of the cartridge is required to have right-hand threads in order to prevent loosening during cutting work.

Also, while the cutting tool holder employed a structure of two parts, consisting of the bracket 2 and the cutting tool holder 1, for facilitating manufacture thereof in the illustrated embodiment, it could be formed as an integral structure to enhance the rigidity of the device.

As described in detail above, the rotary cutting tool according to the present invention can afford the following advantages, due to the fact that a rotary shaft and bearing portions are assembled in the form of a cartridge, separate from a cutting tool holder, and that mounting of the cartridge is effected so as to support and fix the cartridge at two locations consisting of its top and bottom ends in the direction of the action of a cutting reaction force.

(1) Since rigidity in the radial direction of the tip is improved, and heavy cutting becomes possible, the metal removing efficiency is enhanced and the number of man-hour can be reduced.

(2) Since the rigidity in the radial direction of the tip is improved, and chatter during machining work does not occur, the surface roughness and the precision of the worked surface can be improved.

(3) Because of the fact that, even if bearing portions should be worn out, the tool can be continuously used by merely replacing the cartridge, the tool expense becomes cheap. It is only necessary to always maintain spare cartridges, and the reservation of spare cutting tool holders and a repair expenses are unnecessary.

What is claimed is:

1. A rotary cutting tool, comprising:
   a cutting tool holder having a vertical axis and a front end portion;
   a cartridge having an upper end and a lower end detachably mounted on said front end portion of said cutting holder, said cartridge comprising a rigid shaft extending axially between said upper end and said lower end, a hollow rotary shaft fitted around said rigid shaft so as to be coaxially rotatable thereon, and a disposable circular die tip fixedly fitted around said rotary shaft between said upper end and said lower end of said cartridge; and
   stoppers and clamps detachably mounting and fixing said cartridge on said front end portion of said cutting holder such that said cartridge is inclined relative to the vertical axis of said cutting tool holder, said stoppers and clamps supporting said cartridge at said upper and lower ends thereof.

2. The rotary cutting tool of claim 1, wherein said front end portion of said cutting tool holder comprises a dovetail groove for receiving said cartridge and said rigid shaft comprises a bottom surface having dovetail groove guide planes thereon to be engaged with said dovetail groove.

3. The rotary cutting tool of claim 2, wherein said cutting tool holder comprises a main portion and a bracket mounted on said main portion, and said clamps are mounted on said main portion and said bracket so as to engage said cartridge in a direction perpendicular to said dovetail groove in order to suppress movement of said cartridge in that direction.

4. The rotary cutting tool of claim 3, wherein said cartridge further comprises a chip breaker mounted on said disposable circular die tip.

5. The rotary cutting tool of claim 4, wherein said cartridge is mounted on said front end portion of said cutting tool holder such that said cartridge is inclined relative to the vertical axis both in a first plane containing the vertical axis and in a second plane containing the vertical axis perpendicular to the first plane.

6. The rotary cutting tool of claim 3, wherein said cartridge is mounted on said front end portion of said cutting tool holder such that said cartridge is inclined relative to the vertical axis both in a first plane containing the vertical axis and in a second plane containing the vertical axis perpendicular to the first plane.

7. The rotary cutting tool of claim 2, wherein said cartridge further comprises a chip breaker mounted on said disposable circular die tip.

8. The rotary cutting tool of claim 7, wherein said cartridge is mounted on said front end portion of said cutting tool holder such that said cartridge is inclined relative to the vertical axis both in a first plane containing the vertical axis and in a second plane containing the vertical axis perpendicular to the first plane.

9. The rotary cutting tool of claim 2, wherein said cartridge is mounted on said front end portion of said cutting tool holder such that said cartridge is inclined relative to the vertical axis both in a first plane containing the vertical axis and in a second plane containing the vertical axis perpendicular to the first plane.

10. The rotary cutting tool of claim 1, wherein said cartridge further comprises a chip breaker mounted on said disposable circular die tip.

11. The rotary cutting tool of claim 10, wherein said cartridge is mounted on said front end portion of said cutting tool holder such that said cartridge is inclined relative to the vertical axis both in a first plane containing the vertical axis and in a second plane containing the vertical axis perpendicular to the first plane.

12. The rotary cutting tool of claim 1, wherein said cartridge is mounted on said front end portion of said cutting tool holder such that said cartridge is inclined relative to the vertical axis both in a first plane containing the vertical axis and in a second plane containing the vertical axis perpendicular to the first plane.

13. The rotary cutting tool of claim 1, wherein said cutting tool holder comprises a cutting tool holder main body having a front portion with a top thereon and a bracket detachably mounted on said top of said front portion of said cutting tool holder main body with a clamping bolt, said bracket supporting said upper end of said cartridge.

14. The rotary cutting tool of claim 13, wherein one of said stoppers and one of said clamps fix said lower end of said cartridge to said cutting tool holder main body, and another of said stoppers and another of said clamps fix said upper end of said cartridge to said bracket.

15. The rotary cutting tool of claim 1, wherein said cartridge is inclined at an acute angle relative to the vertical axis of said cutting tool holder.

16. The rotary cutting tool of claim 1, wherein said stoppers and clamps comprise first and second adjustable stoppers engaging said upper and lower ends of said cartridge, respectively, and first and second clamps clamping said upper and lower ends of said cartridge, respectively.

17. The rotary cutting tool of claim 1, wherein said rigid shaft comprises said upper and lower ends of said cartridge, said upper and lower ends being engaged by said stoppers and held by said clamps.

18. A rotary cutting tool, comprising:
    a cutting tool holder having a front end portion;
    a cartridge having upper and lower ends detachably mounted on said front end portion of said cutting tool holder, said cartridge comprising a rigid shaft extending axially between said upper and lower ends, a hollow rotary shaft fitted around said rigid shaft so as to be coaxially rotatable thereon, and a circular die tip fixedly fitted around said rotary shaft between said upper and lower ends of said cartridge; and mounting members detachably mounting and fixing said cartridge in position on said front end portion of said cutting tool holder such that said cartridge is supported on said front end of said cutting tool holder at said upper and lower ends of said cartridge.

19. The rotary cutting tool of claim 18, wherein said cartridge is inclined at an acute angle relative to the vertical axis of said cutting tool holder.

20. The rotary cutting tool of claim 18, wherein said rigid shaft has a longitudinal axis and comprises an annular surface perpendicular to the longitudinal axis, said hollow rotary shaft being rotatably supported on said annular surface.

21. The rotary cutting tool of claim 18, wherein said cartridge has bearings between said rigid shaft and said hollow rotary shaft located at said upper and lower ends of said cartridge.

22. The rotary cutting tool of claim 18, wherein said mounting members comprise adjustable stops on said cutting tool holder for adjustably positioning said cartridge on said cutting tool holder and clamps on said cutting tool holder for clampingly engaging said cartridge in position against said stops.

23. The rotary cutting tool holder of claim 22, wherein said cutting tool holder comprises a main body and a bracket detachably mounted on said main body, and wherein one of said stops and one of said clamps is located on said main body and another of said stops and another of said clamps is located on said bracket for detachably mounting and fixing said cartridge therebetween.

24. A rotary cutting tool, comprising:

a cutting tool holder having a vertical axis and a front end portion;

a cartridge having upper and lower ends detachably mounted on said front end portion of said cutting tool holder, said cartridge comprising a rigid shaft extending axially between said upper and lower ends, a hollow rotary shaft fitted around said rigid shaft so as to be coaxially rotatable thereon, and a disposable circular die tip fixedly fitted around said rotary shaft between said upper and lower ends; and means for detachably mounting said cartridge on said front end of said cutting tool holder by holding said cartridge at said upper and lower end thereof such that said cartridge is inclined relative to the vertical axis of said cutting tool holder at an acute angle, wherein said means is adjustable for adjusting the position of said cartridge on said cutting tool holder when said cartridge is mounted on said cutting tool holder.

\* \* \* \* \*